United States Patent Office 3,509,698
Patented May 5, 1970

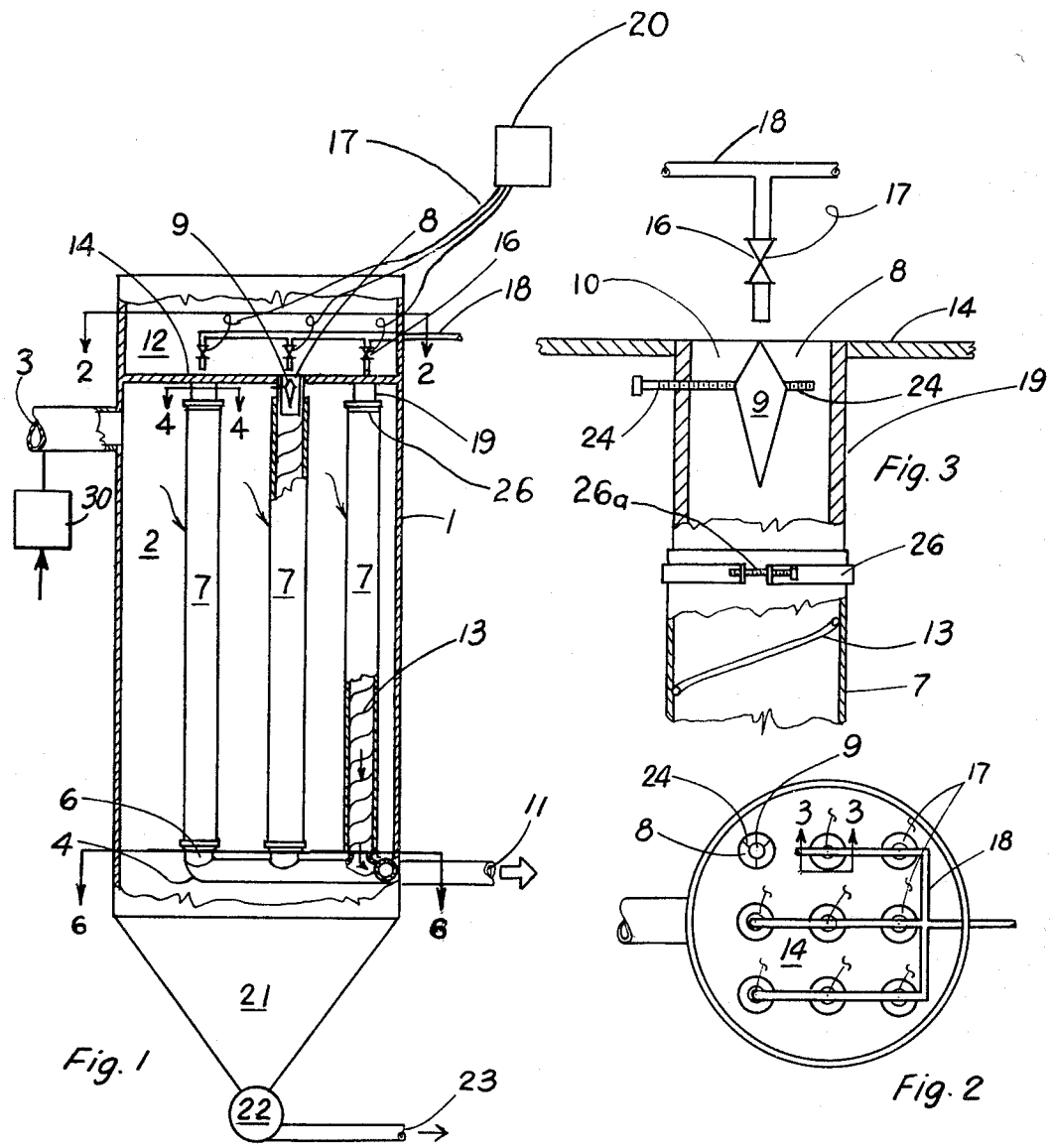

1

3,509,698
FILTER ARRANGEMENT
William A. Medcalf and Lee Ashbrook, Louisville, Ky., assignors to American Air Filter Company, Inc., Louisville, Ky., a corporation of Delaware
Filed May 1, 1967, Ser. No. 634,999
Int. Cl. B01d 46/04
U.S. Cl. 55—302                                                7 Claims

ABSTRACT OF THE DISCLOSURE

A gas cleaning arrangement of the type including at least one gas permeable tubular filter element where a gas stream is passed through the filter element to remove particulate matter carried by the gas stream and the clean filtered gas stream is removed from the central chamber of the tubular element. A diffuser is disposed within the tubular element to define an annular opening between the outer periphery of the diffuser and the inner periphery of the tubular element, and a source of compressed gas is provided to selectively direct an impulse of compressed gas through the anuular opening so the gas is passed along a portion of the inner surface of the tubular element as a generally hollow cylindrical wave.

BACKGROUND OF THE INVENTION

In filtering apparatus where a stream of gas, for example gas containing particulate matter, is passed through gas permeable filter means to remove such particulate matter, accumulation of particulate matter on the surface of the filter undesirably restricts the flow of gas through the filtering apparatus. In previous apparatus various means have been provided to remove the accumulated particulate material from the surface of the filter and some apparatus has included means to periodically direct high velocity jets of gas against the surface where the particulate material is accumulated to clean the filtering surface. Such arrangements are expensive and have required complicated apparatus to move the cleaning jets over the surface. Because of the number of moving parts required and the complexity of the cleaning operation the equipment is subject to failure and objectionable maintenance expenses are often incurred. Furthermore, directing a jet of high velocity gas toward the collector surface undesirably abrades the surface and, in many cases, instead of completely removing the particulate materials from the surface a portion of the accumulated material is imbedded in the permeable media.

In previous apparatus where fabric tubular filter elements have been used, shaker means have been provided to periodically shake the tubular filter elements to mechanically remove the accumulated particulate material from the filter surface. However, such arrangements are complicated and vibration of the tubular elements often causes damage to the equipment, flex fatigue of the filter media, and leads to failure of one or both.

In other gas cleaning apparatus means have been provided to periodically reverse the filtering flow of gas through the permeable filter element so that accumulated materials are blown off the filter surface by the reverse flow of gas. In one such previous apparatus gas flow is diverted around the apparatus during the cleaning cycle and the equipment is expensive because gas bypass means must be provided and requires the use of additional valves, including valves in the conduit carrying the gas to be cleaned, the conduit carrying the gas to reverse gas flow through the filter element, and the filtered gas outlet conduit to control the sequence and path of gas flow through the filter apparatus. The valves must be large enough to accommodate the full gas flow capacity of the apparatus and are closed on a regular basis so either manual labor or complicated switching means is required. After extended use the valves frequently begin to leak and must be replaced, especially if the gas stream or the material carried by the gas stream is corrosive. Also, in such arrangements the cleaning apparatus must be removed from service for extended periods of time during the cleaning operation.

In another previous apparatus, where tubular gas permeable filter elements have been provided and the flow of gas is from the outside through the tubular element and into the control chamber, the filter surface has been cleaned by introducing a high energy pulse of compressed gas into the filtered gas outlet of the tubular element so the high energy gas pulse extends over the entire cross-sectional area of the tubular member and passes along a portion of the length of the tubular element to remove previously accumulated particulate matter from the surface of the collector. In such apparatus only one opening is provided in the tubular element and the pulse of gas is directed through a venturi in the filtered gas outlet so the direction of flow of the gas in the tubular element is reversed during the cleaning cycle. While such an arrangement operates satisfactorily for certain applications the length of the tubular member which can be cleaned by such previous arrangement is severely limited regardless of the pressure of the compressed gas and the geometric configuration of the tubular element. Furthermore, in accordance with one feature of the present invention as hereinafter described it has been recognized that periodically reversing the flow of gas in the entire tubular filter element during the cleaning cycle significantly reduces the maximum capacity of the gas cleaning apparatus.

SUMMARY OF THE INVENTION

In accordance with the present invention an efficient inexpensive apparatus is provided to periodically clean a tubular filter without significantly affecting the capacity of the gas cleaning device, which does not require complicated expensive valving and gas bypass arrangements which are subject to frequent failure and maintenance expense. Furthermore, the present invention provides an apparatus to efficiently clean the filter surface of gas permeable tubular fabric filter without the use of complicated shaker mechanism or air jets to direct a stream of high velocity gas to the surface.

Moreover, the present invention provides a gas cleaning arrangement including a tubular filter element which is cleaned by directing a pulse of high energy gas longitudinally along a portion of the tubular element. The present invention recognizes that the efficiency of removal of particulate materials accumulated on the filter surface and the length of the tubular element which can be effectively cleaned is significantly affected by the configuration of the pulse of high energy gas passed along the tubular element and the arrangement of the gas filtering device.

Various other features of the present invention will become obvious to those skilled in the art upon reading the disclosure set forth hereinafter.

More particularly, the present invention provides an apparatus for filtering particulate matter from a gaseous stream including at least one filter unit comprising: a tubular gas permeable filter element; means for moving a gaseous stream in filtering flow through the element; gas diffuser means disposed to form an annular opening between the outer periphery of the diffuser and the inner periphery of the tubular filter element; and, means to selectively release a pulse of high energy gas in a direction toward the diffuser so gas flows through the annular opening and along a portion of the inside surface of the tubular filter element as a hollow wave.

It is to be understood that the description of one example of the present invention given herein is not by way of limitation and that various changes can be made in the arrangement, form, or configuration of the apparatus disclosed herein without departing from the scope or spirit of the present invention.

Referring now to the drawings which disclose one example of the present invention:

FIG. 1 is an elevational view, in section, of an apparatus in accordance with the present invention;

FIGURE 2 is a view taken along a plane passing through line 2—2 of FIGURE 1;

FIGURE 3 is an enlargement of a fragmentary view taken along a plane passing through line 3—3 of FIGURE 2;

Figure 5:
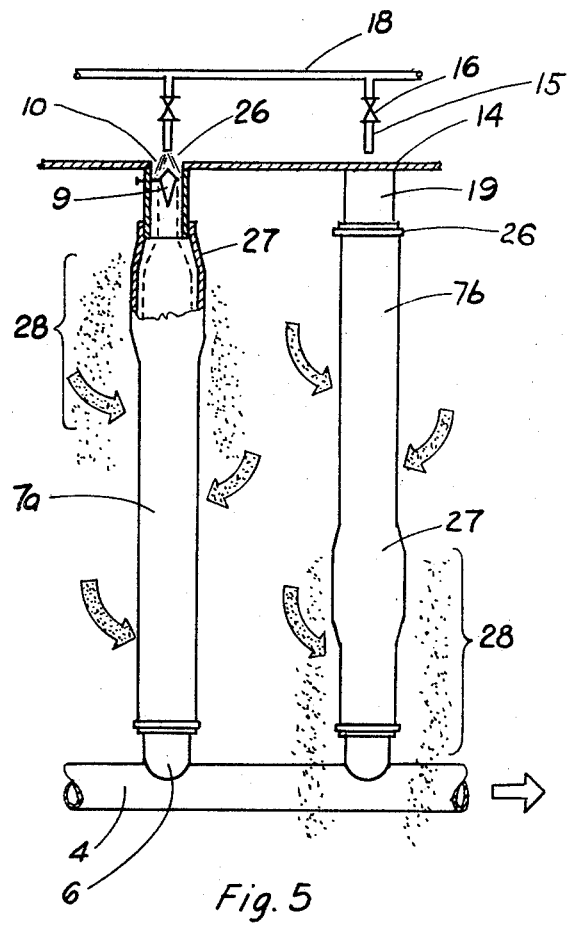
FIGURE 5 is a schematic drawing illustrating the operation of an apparatus in accordance with the present invention; and, FIGURE 6 is a view taken along a plane passing through line 6—6 of FIGURE 1.

As shown in FIGURE 1, a gas cleaning arrangement in accordance with the present invention can include, generally, a casing 1 defining a gas inlet chamber 2, having a dirty gas inlet 3 and a filtered gas outlet 11 and means to hold tubular gas permeable filter elements 7 in generally longitudinal relation within casing 1. As shown by the arrows, dirty gas enters inlet 3, passes through tubular filter element 7 and leaves casing 1 by means of outlet 11. Particulate material carried by the dirty gas entering the chamber is deposited on the outer surface of filter element 7 and is removed therefrom, by means hereinafter described, to be collected in a hopper 21 provided at the bottom of casing 1. The particulate material collected in hopper 21 is removed from casing 1 through discharge outlet 23 by means of a feeder mechanism 2, for example a rotary gas lock feeder.

Various means can be provided to suspend the tubular gas permeable filter elements 7 within casing 1. In the example of the figures a manifold 4 is provided adjacent one end of casing 1 which includes nozzles 6 adapted to receive one end of the tubular filter elements 7. A plate 14 is provided to extend across casing 1 at an end opposite manifold 4 to define a chamber 12. Plate 14 includes a number of cooperative nozzles 19, one in aligned relation with each nozzle 6 of manifold 4 where each nozzle 6 is adapted to receive an opposite end of a tubular element 7. Nozzles 6 and 19 are in cooperative paired, aligned relation and are advantageously disposed so each tubular filter element 7 extends generally from a nozzle 19 to a corresponding nozzle 6 in substantially parallel longitudinal relation within casing 1. Tubular filter element 7 can be of a desired geometric configuration, for example circular, and can be made of selected materials, for example nylon fabric of selected pore size depending on the particulate material to be removed from the gas stream and the desired removal efficiency. When fabric filter elements are used, spring stiffener means 13, for example coiled helices of spring steel, can be provided inside each tubular filter element to support the tubular element in the desired configuration against the pressure differential which exists from the inside to the outside of the tube and also to restrict lateral movement of elements 7 within casing 1.

Each tubular filter element 7 is secured to nozzles 6 and 19, respectively, for example by means of bands 26 which can be drawn tight around collectors 7, for example by means of screw fasteners 26A.

As shown in FIGS. 2 and 5 manifold 4 can be provided with a selected number of nozzles in a particular configuration depending on the size of casing 1, the number of filter elements to be included in the casing and, the desired spacing between the filter elements 7.

Figure 4:
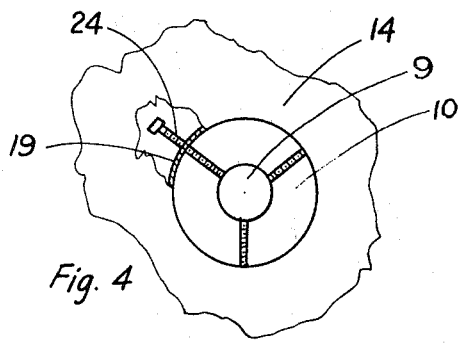
FIGURE 4 is an enlarged view taken along a plane passing through line 4—4 of FIGURE 1.
Figure 6:
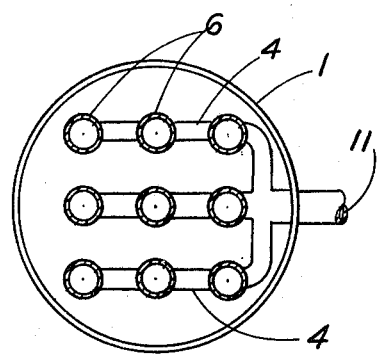

As shown in the FIGURE 3 each nozzle 19 of plate 14 defines an opening 8 to permit introduction of compressed gas to each tubular filter elements 7 as hereinafter described and in accordance with one feature of the present invention a gas diffuser 9 of selected configuration is disposed in generally centered relation to each tubular element 7 to define an annular opening 10 between the outer periphery of diffuser 9 and the inside of the tubular element 7 (FIGURE 4). As shown in the figures diffuser 9 can be disposed within each opening 8 to tubular elements 7. Diffusers 9 can be of various configurations and where, as in the example of the figures, opening 8 is circular the diffusers can be conical with the apex of each cone in cooperative alignment with the axis of the respective tubular element. In the example of the figures diffusers 9 are in the shape of a pair of cones of equal base dimensions but different height dimensions where the cones are in contiguous base to base relation with the axis of the resulting double cone in substantial alignment with the longitudinal axis of the tubular element. Diffusers 9 can in some cases be welded into nozzles 19 in fixed relation, or, for example as shown in the drawings, can be supported within opening 8 by means of cooperative threaded screws 24, FIGS. 3 and 4, which are received by threaded openings in nozzles 19 to extend across openings 8 to abut diffusers 9.

Further, in accordance with one feature of the present invention, a compressed gas manifold 18 is provided in chamber 12 and includes compressed gas nozzles 15, one nozzle for each diffuser 9, where nozzles 15 are disposed to direct a stream of compressed gas toward each diffuser and in the example of the figures the outlet is directed generally toward the apex of the conical diffuser 9. Each nozzle 15 can include a valve 16, for example a solenoid valve connected to an electrical source 20 by means of wires 17 to be selectively opened to provide a stream of compressed gas. The electrical source 20 can include means, for example time cycle means, to sequentially open valves 16 to provide a pulse of compressed air to clean filter elements 7 as hereinafter described. The timing sequence can be such that all of the valves 16 open at one time or the valves can be separately operated on an individual basis.

In operation, dirty gas enters chamber 2 through inlet 3 and the flow of gas is generally in the direction as shown by the arrows of FIG. 1 and 5. The pressure in chamber 2 can be subatmospheric or superatomspheric depending on the particular application of the gas cleaning device. The gas entering inlet 3 passes to casing 1, filtered gas leaves casing 1 by means of outlet 11, and the particulate matter contained in the dirty gas is deposited on the outer surface of the filter element 7 to fall to hopper 21 for removal therefrom. Apparatus in accordance with the present invention can be used in various applications and in some applications the particulate matter separated from the gas stream is valuable and it is desirable to recover such material while in other cases the material separated from the gas stream is of no value and the material emitted from outlet 23 is discarded. Accumulation of the material separated from the gas stream plugs the pores in the tubular filter element 7 and it is necessary periodically remove such material from the surface of the filtering element to assure adequate rate of gas filtration. In accordance with one feature of the present invention, as illustrated in FIGURE 5, a pulse of compressed air is periodically directed toward opening 8 of nozzles 19 so the pulse of gas flows over diffuser 9 to form a hollow cylinder of compressed gas as shown by the dotted lines in the filter element 7A of FIGURE 5. The hollow cyindrical wave of gas passes along the inner surface of each filter element 7 so a portion 27 of the filter element is expanded. The accumulated particulate material on the surface of the tubular element is removed by movement of the tubular element resulting from the expansion where the cleaning action is a result of several factors including a sudden acceleration of the media in a direction counter to the normal direction of gas flow through the media, and the total displacement of the media in response to the movement of the hollow wave.

As shown in FIG. 5 the cleaning pulse can be sequentially provided to different collectors so that different collectors are cleaned at different times. In the example of FIGURE 5 element 7A shows the cleaning pulse is just entering the tubular element so the expanded section 27 is adjacent nozzle 19 whereas a previous cleaning pulse 27 has essentially traversed the entire length of tubular element 7B.

In previous apparatus which has included means to provide a pulse of high energy gas through tubular filter element for cleaning the element a single opening has been provided for emission of filtered gas and the introduction of the cleaning pulse, the cleaning pulse has been directed into the tubular element in a direction counter to the normal direction of flow of the filtered gas within the element so the flow of gas within the tubular collector has ceased during the cleaning cycle. It will be rcognized that the present invention can be adapted to be used in such arrangements and in other arrangements including those, as shown in the figures, where the compressed gas is introduced at one opening in the tubular element and filtered gas removed from another opening. In the arrangement providing a single opening to the tubular filter the filter element is filled with the gas from the cleaning pulse so there is no filtration during the cleaning cycle and, in fact, the gas introduced during the cleaning cycle must be removed from the element before the normal operation is resumed. In the example of the apparatus in accordance with the present invention, as shown in the figures, filtering flow continues along the entire length of the bag during the cleaning cycle, except for the portion of the tubular element 27 which is in contact with the cleaning wave and is in expanded condition. It will be noted that in the example of the figures the compressed gas flows through the length of the tubular element to be mixed with the filtered gas in manifold 4 so that upon completion of the cleaning cycle it is not necessary to withdraw gas introduced by the cleaning pulse before normal filtering flow can be resumed, as is the case with some previous apparatus. Particles of material 28 accumulated on the surface of the filter element are thrown away from the filter element as the cleaning wave travels the length of the tubular element and fall to hopper 21 as hereinbefore described.

In some previous collectors where a pulse of high energy gas in introduced into the central portion of the tubular filter element, the pulse of gas has been introduced to extend across the entire cross-sectional area of the tubular element and in such arrangements it has been found that the maximum length of the collector has been limited, for example 6 to 8 feet, regardless of the pressure of the compressed gas and the cross-sectional area of the tubular filter element and the configuration of the tubular element and gas cleaning device. In accordance with the present invention it has been recognized that the use of diffusers, for example diffuser 9, to form the pulse of compressed gas into a cylindrical or toridial shape greatly increases the length of the tubular filter element which can be used and in some instances tubular elements as long as 12 feet have been successfully cleaned through the use of apparatus in accordance with the present invention.

While the example as shown in the figures illustrates an arrangement where dirty gas flows from the outside to the inside of tubular elements 7 in filtering flow it will be recognized that the present invention likewise embraces an arrangement where dirty gas enters the chamber defined by the tubular element and flows to the outside of the element in filtering flow.

The invention claimed is:

1. Apparatus for filtering particulate matter from a gaseous stream including at least one filtering unit comprising: a flexible tubular-shaped gas permeable filter element having a clean gas outlet at one end of said filter element; means for moving a gaseous stream in filtering flow through said element; elongate gas diffuser means having one generally conical-shaped substantially gas impervious end centrally disposed within an opening at one end of said tubular element in substantially axial alignment with the longitudinal axis of said tubular element with said substantially gas impervious end directed outwardly from said tubular element to form an annular opening between the outer periphery of said diffuser means and the inner periphery of said tubular element; means to support said diffuser means; nozzle means disposed in axial alignment with the longitudinal axis of said tubular element in spaced relation from said element, said nozzle means having a nozzle outlet smaller than said opening in said tubular element in which said diffuser is disposed and said nozzle outlet being adjacent to and directed toward the apex of said gas impervious end of said diffuser means; and, means to selectively release a pulse of compressed gas through said nozzle outlet in a direction toward said apex so gas emitted in said pulse flows over said gas impervious end of said diffuser and expands through said annular opening to form an annular wave which travels in a longitudinal direction through a portion of said element and along a portion of the inside surface of said tubular filter element.

2. The filter unit of claim 1 wherein one end of said tubular element defines said outlet opening and the other end of said tubular element defines a second opening to said tubular element, said diffuser means is disposed within said second opening and said means to release said pulse of high energy gas is directed toward said diffuser means and into said second opening so filtered gas is emitted from said tubular element through said outlet opening and said pulse of high energy gas is released through said second opening to travel through a portion of said tubular member as a hollow wave and out of said tubular element through said outlet opening.

3. The apparatus of claim 1 wherein said tubular filter element is made of fabric of selected weave.

4. The apparatus of claim 3 including coiled spring stiffener means disposed within said tubular elements to support said tubular elements in selected configuration.

5. The apparatus of claim 1 wherein said diffuser means includes a second conical end having a base section of generally the same size and shape as the base section of said first end with said second end disposed base to base with said first end.

6. An apparatus for removing particulate matter from a gas stream including: a casing having a dirty gas inlet and a clean gas outlet; plate means, having cooperative spaced apertures, disposed across said casing to define a dirty gas inlet chamber, said dirty gas inlet chamber communicating with said dirty gas inlet, and a plenum chamber; gas outlet manifold outlet means located within said dirty gas inlet chamber to communicate with said gas outlet to remove filtered gas from said casing wherein said manifold means includes aperture means in cooperative, generally aligned, relation with said apertures of said plate means; tubular, flexible gas permeable flexible filter elements having aperture means defined at opposite ends thereof, each joined at a first end to said plate means having one said aperture disposed in communicative relation with selected aperture means of said plate means and joined at a second end to said manifold means having the other aperture disposed in communicative relation with selected aperture means of said manifold means; means to move a gas stream in filtering flow from said dirty gas inlet chamber through said tubular gas permeable filter element to said gas outlet manifold means; elongate gas diffuser means having one generally conically-shaped, substantially gas impervious, end disposed within selected said aperture means of said plate means and said aperture at the end of said tubular element joined to said plate means; means to support said diffuser means in generally axially aligned relation with the longitudinal axis of said tubular element with the apex of said gas impervious end directed outwardly with respect to said aperture of said plate means and said tubular element to form an annular opening between the outer periphery of said diffuser and the inner periphery of said aperture and said tubular element; and, compressed gas supply means disposed in said plenum chamber in spaced relation from said diffuser means including nozzle means, having an outlet of smaller area than said aperture of said baffle means and directed toward the apex of said gas impervious end of said diffuser means, to selectively supply a pulse of compressed gas toward said diffuser means so said gas pulse flows over said substantially gas impervious end, expands through said annular opening to form an annular wave which travels along a portion of the inside of said tubular element toward said gas outlet manifold.

7. The apparatus of claim 6 including hopper means disposed to receive particulate matter removed from the surface of said tubular elements by the reaction of said tubular element as said hollow wave passes along a portion of the length of said tubular element.

References Cited

UNITED STATES PATENTS

| | | | |
|---|---|---|---|
| 1,157,131 | 10/1915 | Sutton | 55—96 |
| 1,163,318 | 12/1915 | Bryant | 55—293 |
| 2,048,613 | 7/1936 | McKee | 55—418 |
| 2,892,512 | 6/1959 | Watts et al. | 55—302 |
| 3,073,097 | 1/1963 | Hallett et al. | 55—283 |
| 3,256,679 | 6/1966 | Snyder | 55—96 |
| 3,267,649 | 8/1966 | Vicard | 55—293 |
| 3,333,401 | 8/1967 | Abboud | 55—293 |
| 3,385,033 | 5/1968 | Bashore et al. | 55—341 |
| 3,387,712 | 6/1968 | Schrink | 210—411 |
| 3,394,532 | 7/1968 | Oetiker | 55—302 |
| 420,136 | 1/1890 | Willis | 210—323 |
| 3,299,463 | 1/1967 | McEachern | 15—352 |

FOREIGN PATENTS

| | | |
|---|---|---|
| 812,244 | 4/1959 | Great Britain. |
| 981,806 | 1/1965 | Great Britain. |
| 1,016,556 | 1/1966 | Great Britain. |

HARRY B. THORNTON, Primary Examiner

B. NOZICK, Assistant Examiner

U.S. Cl. X.R.

55—341, 379